(12) United States Patent
Yang et al.

(10) Patent No.: US 11,803,080 B2
(45) Date of Patent: Oct. 31, 2023

(54) POLARIZER MODULE AND OPERATION METHOD THEREOF

(71) Applicant: Au Optronics Corporation, Hsinchu (TW)

(72) Inventors: Syuan-Ling Yang, Hsinchu (TW); Guan-Yu Chen, Hsinchu (TW); Chao-Wei Li, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/736,996

(22) Filed: May 4, 2022

(65) Prior Publication Data

US 2022/0260767 A1    Aug. 18, 2022

Related U.S. Application Data

(63) Continuation-in-part of application No. 16/533,798, filed on Aug. 7, 2019, now abandoned.

(30) Foreign Application Priority Data

Dec. 22, 2018  (TW) .................................. 107146583

(51) Int. Cl.
*G02F 1/1335*  (2006.01)
*G02F 1/1347*  (2006.01)
*G02B 5/30*  (2006.01)
*G02F 1/133*  (2006.01)

(52) U.S. Cl.
CPC ...... *G02F 1/133536* (2013.01); *G02F 1/1347* (2013.01); *G02B 5/3016* (2013.01); *G02F 1/13306* (2013.01)

(58) Field of Classification Search
CPC ............ G02F 1/133536; G02F 1/1347; G02F 1/13306
See application file for complete search history.

(56) References Cited

U.S. PATENT DOCUMENTS

| | | | |
|---|---|---|---|
| 8,872,746 B2 | 10/2014 | Cheong et al. | |
| 10,642,094 B2 | 5/2020 | Chen et al. | |
| 2004/0100598 A1* | 5/2004 | Adachi | ............... G02F 1/13362 349/113 |
| 2018/0284506 A1 | 10/2018 | Tsuda et al. | |
| 2019/0107753 A1 | 4/2019 | Chen et al. | |

FOREIGN PATENT DOCUMENTS

CN             107797349           3/2018

OTHER PUBLICATIONS

"Office Action of India Counterpart Application", dated May 25, 2022, p. 1-p. 7.

* cited by examiner

*Primary Examiner* — Dung T Nguyen
(74) *Attorney, Agent, or Firm* — JCIPRNET

(57) ABSTRACT

The present invention provides a polarizer module and an operation method thereof. The polarizer module includes a bifacial reflective polarizer, a first liquid crystal layer, a second liquid crystal layer, a first polarizer, and a second polarizer. The bifacial reflective polarizer has a first surface and a second surface opposite to each other. The first liquid crystal layer and the second liquid crystal layer are disposed on the first surface and the second surface respectively. The first polarizer and the second polarizer are disposed on the first liquid crystal layer and the second liquid crystal layer respectively.

8 Claims, 14 Drawing Sheets

POLARIZER MODULE AND OPERATION METHOD THEREOF

CROSS-REFERENCE TO RELATED APPLICATION

This application is a continuation-in-part application of and claims the priority benefit of U.S. application Ser. No. 16/533,798, filed on Aug. 7, 2019, now pending, which claims the priority benefit of Taiwan application serial no. 107146583, filed on Dec. 22, 2018. The entirety of each of the above-mentioned patent applications is hereby incorporated by reference herein and made a part of this specification.

TECHNICAL FIELD

The invention relates to an optical module and an operation method thereof, and more particularly, to a polarizer module and an operation method thereof.

BACKGROUND

In general, a liquid crystal display can be generally divided into a transmissive liquid crystal display, a reflective liquid crystal display, and a transflective liquid crystal display. With the increasing use of displays, transparent displays have been gradually developed. A transparent display means that the display itself has a certain degree of transparency and can clearly display the views behind a display panel. The transparent display is suitable for a variety of applications such as building windows, car windows and shop windows, and has the potential for future development as an information display in addition to the original transparent display function, which has attracted much attention from the market.

However, the transparency of transparent displays can be used to develop applications that cannot be done by existing non-transparent displays, but with relative limitations. For instance, although the transparent display technology may achieve the transparent display function, but it is unable to switch between a transparent mode and a mirror mode; and although the transparent display technology of applying a polymer dispersed liquid crystal (PDLC) may achieve an anti-peep effect, but it is poor in shading and heat insulation.

SUMMARY

The invention provides a polarizer module and an operation method thereof that can switch between the mirror mode and the transparent mode.

An embodiment of the invention provides a polarizer module, which includes a bifacial reflective polarizer, a first liquid crystal layer, a second liquid crystal layer, a first polarizer, and a second polarizer. The bifacial reflective polarizer has a first surface and a second surface opposite to each other. The first liquid crystal layer and the second liquid crystal layer are disposed on the first surface and the second surface respectively. The first polarizer and the second polarizer are disposed on the first liquid crystal layer and the second liquid crystal layer respectively.

An embodiment of the invention provides an operation method of polarizer module, which includes steps of: providing the polarizer module described above; and enabling the polarizer module to perform a dual mirror mode, a single mirror mode or a transparent mode. When light is reflected by the bifacial reflective polarizer and pass through the first polarizer and the second polarizer, respectively, the polarizer module is in the dual mirror mode. When the light is reflected by the bifacial reflective polarizer and pass through only one of the first polarizer and the second polarizer, the polarizer module is in the single mirror mode. When the light transmits through the bifacial reflective polarizer, the polarizer module is in the transparent mode.

Based on the above, due to the polarizer module of the invention includes the bifacial reflective polarizer, the first liquid crystal layer, the second liquid crystal layer, the first polarizer and the second polarizer configured as above, so the polarizer module of the invention can switch between the mirror mode (e.g. the dual mirror mode or the single mirror mode) and the transparent mode by operating the first liquid crystal layer and/or the second liquid crystal layer.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
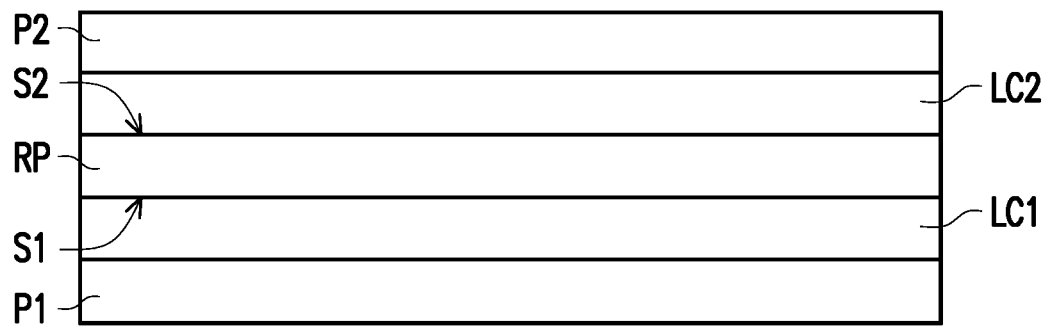
FIG. 1 is a cross-sectional view of the polarizer module in an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The invention will be described more comprehensively below with reference to the drawings for the embodiments. However, the invention may also be implemented in different forms rather than being limited by the embodiments described in the invention. Thicknesses of layer and region in the drawings are enlarged for clarity. The same reference numbers are used in the drawings and the description to indicate the same or like parts, which are not repeated in the following embodiments. Further, the language used to describe the directions such as up, down, left, right, front, back or the like in the reference drawings is regarded in an illustrative rather than in a restrictive sense. Thus, the language used to describe the directions is not intended to limit the scope of the invention.

Figure 2A:
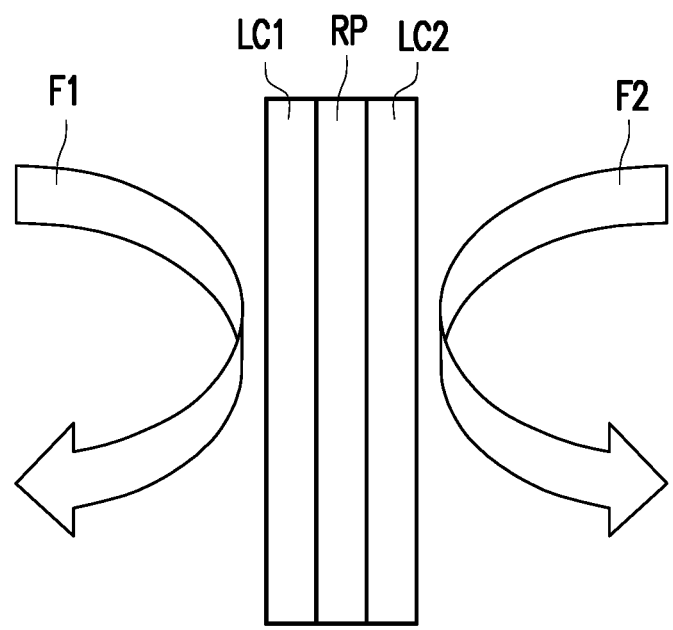
FIG. 2A to FIG. 2C are schematic diagrams illustrating how the polarizer module switches between the mirror mode and the transparent mode by operating the first liquid crystal layer and/or the second liquid crystal layer in an embodiment of the invention.
Figure 2B:
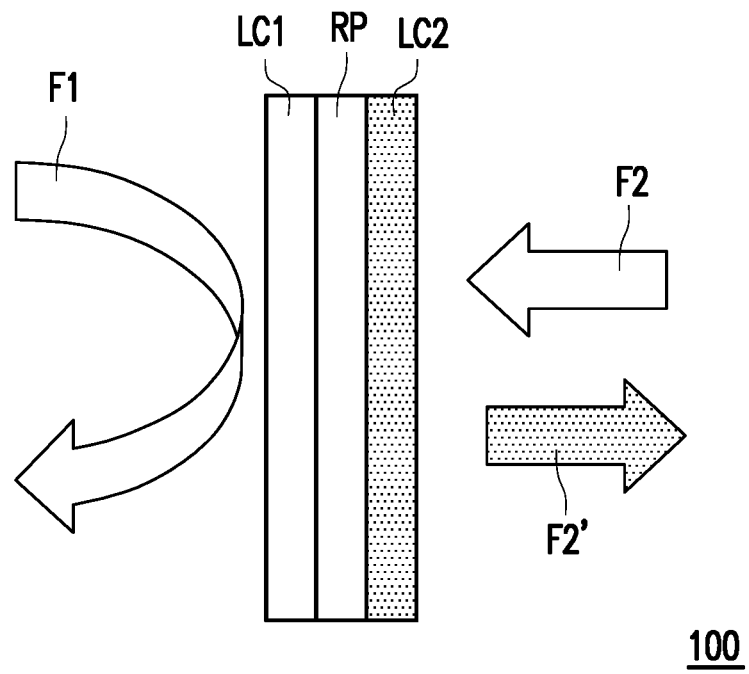
Figure 2C:
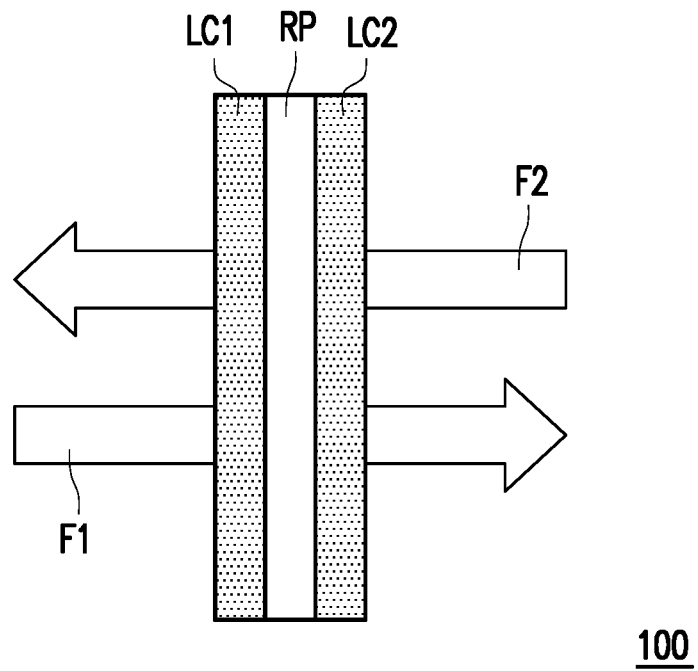

FIG. 1 is a cross-sectional view of the polarizer module in an embodiment of the invention. FIG. 2A to FIG. 2C are schematic diagrams illustrating how the polarizer module switches between the mirror mode and the transparent mode by operating the first liquid crystal layer and/or the second liquid crystal layer in an embodiment of the invention. FIG. 3A to FIG. 3D are schematic diagrams illustrating how the polarizer module switches between the mirror mode and the transparent mode by operating the first liquid crystal layer and/or the second liquid crystal layer in another embodiment of the invention. FIG. 4A to FIG. 4C are schematic diagrams illustrating how the polarizer module switches between the mirror mode and the transparent mode by operating the first liquid crystal layer and/or the second liquid crystal layer in yet another embodiment of the invention.

With reference to FIG. 1, a polarizer module 100 includes a bifacial reflective polarizer RP, a first liquid crystal layer LC1, a second liquid crystal layer LC2, a first polarizer P1, and a second polarizer P2. In this embodiment, due to the polarizer module 100 may switch between the mirror mode (including the dual mirror mode and the single mirror mode) and the transparent mode, so it is applicable to a transparent display, a smart window or a smart wall to further improve the applicability of the polarizer module 100.

The bifacial reflective polarizer RP has a first surface S1 and a second surface S2 opposite to each other. For instance, as shown in FIG. 1, the first surface S1 may be a lower surface of the bifacial reflective polarizer RP; and the second surface S2 may be an upper surface of the bifacial reflective polarizer RP, but the invention is not limited thereto. In this embodiment, the bifacial reflective polarizer RP may have a reflection axis for reflecting a polarized light parallel to the reflection axis. For instance, as shown in FIG. 2A, when polarization directions of light F1 and light F2 incident to opposite sides of the bifacial reflective polarizer RP are parallel to the reflection axis of the bifacial reflective polarizer RP, the light F1 and light F2 will be reflected by the bifacial reflective polarizer RP. The bifacial reflective polarizer RP may have a transmission axis for allowing a polarized light parallel to the transmission axis to transmit through the bifacial reflective polarizer RP. For instance, as shown in FIG. 2C, when the polarization directions of the light F1 and light F2 incident to the opposite sides of the bifacial reflective polarizer RP are parallel to the transmission axis of the bifacial reflective polarizer RP, the light F1 and light F2 will pass through the bifacial reflective polarizer RP. In this embodiment, the reflection axis and the transmission axis of the bifacial reflective polarizer RP may be orthogonal to each other. In other words, when the polarization directions of the light F1 and light F2 are perpendicular to the reflection axis of the bifacial reflective polarizer RP, the light F1 and light F2 can transmit through the bifacial reflective polarizer RP. In this embodiment, the bifacial reflective polarizer RP may be a reflective polarizer mirror (RPM) or a wire grid polarizer (WGP).

The first liquid crystal layer LC1 and the second liquid crystal layer LC2 are disposed on the first surface S1 and the second surface S2 of the bifacial reflective polarizer RP respectively. In some embodiments, the first liquid crystal layer LC1 and the second liquid crystal layer LC2 may include in-plane-switching liquid crystal molecules that can be rotated or switched by a horizontal electric field or vertical switching liquid crystal molecules that can be rotated or switched by a vertical electric field, but the invention is not limited thereto. In other embodiments, the first liquid crystal layer LC1 and the second liquid crystal layer LC2 may include polymer dispersed liquid crystals (PDLC) or other suitable liquid crystals.

The first polarizer P1 and the second polarizer P2 are disposed on the first liquid crystal layer LC1 and the second liquid crystal layer LC2 respectively. In this embodiment, each of the first polarizer P1 and the second polarizer P2 may have an absorption axis for absorbing a polarized light parallel to the absorption axis. Each of the first polarizer P1 and the second polarizer P2 may have a transmission axis for allowing a polarized light parallel to the transmission axis to transmit through the first polarizer P1 and the second polarizer P2. In this embodiment, the absorption axis and the transmission axis of each of the first polarizer P1 and the second polarizer P2 may be orthogonal to each other. In other words, when the polarization directions of the light F1 and light F2 are perpendicular to the absorption axis of the first polarizer P1 or the second polarizer P2, the light F1 and light F2 can transmit through the first polarizer P1 or the second polarizer P2.

Based on the above, due to the polarizer module 100 includes the bifacial reflective polarizer RP, the first liquid crystal layer LC1, the second liquid crystal layer LC2, the first polarizer P1 and the second polarizer P2 configured as above, so the polarizer module 100 can switch between the mirror mode and the transparent mode by operating the first liquid crystal layer LC1 and/or the second liquid crystal layer LC2.

An operation method of the polarizer module 100 may include steps of: providing the polarizer module 100 described above; and enabling the polarizer module 100 to perform the dual mirror mode, the single mirror mode or the transparent mode.

In the following paragraphs, FIG. 2A to FIG. 2C, FIG. 3A to FIG. 3D and FIG. 4A to FIG. 4C will be used as examples to describe how the polarizer module switches between the mirror mode (including the dual mirror mode and the single mirror mode) and the transparent mode by operating the first liquid crystal layer LC1 and/or the second liquid crystal layer LC2 according to different embodiments of the invention. In FIG. 2A to FIG. 2C, FIG. 3A to FIG. 3D and FIG. 4A to FIG. 4C, the first polarizer P1 and the second polarizer P2 are not illustrated so the examples regarding whether the light F1 and light F2 will transmit through the bifacial reflective polarizer RP or will be reflected by the bifacial reflective polarizer RP can be clearly expressed.

When the polarizer modules 100, 200 and 300 are in the dual mirror mode, the light F1 and the light F2 may be reflected by the bifacial reflective polarizer RP, so both sides of the polarizer modules 100, 200 and 300 are in a mirror state.

When the polarizer modules 100, 200, 300 are in the single mirror mode, one of the light F1 and the light F2 may be reflected by the bifacial reflective polarizer RP, so that one side of the polarizer modules 100, 200 and 300 is in the mirror state; and another one of the light F1 and the light F2 may pass through the bifacial reflective polarizer RP and may be absorbed by the first polarizer P1 or the second polarizer P2, so that another one side of the polarizer modules 100, 200 and 300 is in a black state.

When the polarizer modules 100, 200 and 300 are in the transparent mode, the light F1 may pass through the bifacial reflective polarizer RP and the second polarizer P2, so that one side of the polarizer modules 100, 200 and 300 is in a transparent state; and the light F2 may pass through the bifacial reflective polarizer RP and the first polarizer P1, so that another side of the polarizer modules 100, 200 and 300 is also in the transparent state.

In the following paragraphs, FIG. 2A to FIG. 2C are used to illustrate how the polarizer module 100 in an embodiment of the invention switches between the mirror mode and the transparent mode by operating the first liquid crystal layer LC1 and/or the second liquid crystal layer LC2. FIG. 2A to FIG. 2C illustrate the examples of enabling the polarizer module 100 to perform the dual mirror mode, the single mirror mode, and the transparent mode, respectively. In this embodiment, a reflection axis of the bifacial reflective polarizer RP is perpendicular to an absorption axis of the first polarizer P1 and an absorption axis of the second polarizer P2.

Referring to FIG. 2A, when the reflection axis of the bifacial reflective polarizer RP is perpendicular to the absorption axis of the first polarizer P1 and the absorption axis of the second polarizer P2, the dual mirror mode may be performed by not applying voltage to the first liquid crystal layer LC1 and the second liquid crystal layer LC2. For instance, a polarization direction of a polarized light passed through the first polarizer P1 and the first liquid crystal layer LC1 is parallel to the reflection axis of the bifacial reflective polarizer RP, therefore, the light F1 may be reflected by the bifacial reflective polarizer RP so that one side of the polarizer module 100 is in the mirror state. Similarly, a polarization direction of a polarized light passed through the second polarizer P2 is parallel to the reflection axis of the bifacial reflective polarizer RP, therefore, the light F2 may be reflected by the bifacial reflective polarizer RP so that another side of the polarizer module 100 is also in the mirror state.

Referring to FIG. 2B, when the reflection axis of the bifacial reflective polarizer RP is perpendicular to the absorption axis of the first polarizer P1 and the absorption axis of the second polarizer P2, the single mirror mode may be performed by applying voltage to only one of the first liquid crystal layer LC1 and the second liquid crystal layer LC2. For instance, voltage can be applied to the second liquid crystal layer LC2 while no voltage is applied to the first liquid crystal layer LC1. In this way, a polarization direction of a polarized light passed through the second polarizer P2 and the second liquid crystal layer LC2 is perpendicular to the reflection axis of the bifacial reflective polarizer RP and parallel to the absorption axis of the first polarizer P1, therefore, the light F2 may transmit through the bifacial reflective polarizer RP and may be absorbed by the first polarizer P1, so that one side of the polarizer module 100 is in the black state (as shown by an arrow F2'). On the other hand, a polarization direction of a polarized light passed through the first polarizer P1 and the first liquid crystal layer LC1 is parallel to the reflection axis of the bifacial reflective polarizer RP, therefore, the light F1 may be reflected by the bifacial reflective polarizer RP so that another side of the polarizer module 100 is in the mirror state.

Referring to FIG. 2C, when the reflection axis of the bifacial reflective polarizer RP is perpendicular to the absorption axis of the first polarizer P1 and the absorption axis of the second polarizer P2, the transparent mode may be performed by simultaneously applying voltage to the first liquid crystal layer LC1 and the second liquid crystal layer LC2. For instance, a polarization direction of a polarized light passed through the first polarizer P1 and the first liquid crystal layer LC1 is perpendicular to the reflection axis of the bifacial reflective polarizer RP, therefore, the light may pass through the bifacial reflective polarizer RP. When the polarized light passed through the bifacial reflective polarizer RP further passes through the second liquid crystal layer LC2, the polarization direction of the polarized light is perpendicular to the absorption axis of the second polarizer P2, therefore, the light may pass through the second polarizer P2 so that one side of the polarizer module 100 is in the transparent state. Similarly, a polarization direction of a polarized light passed through the second polarizer P2 and the second liquid crystal layer LC2 is perpendicular to the reflection axis of the bifacial reflective polarizer RP, therefore, the light may pass through the bifacial reflective polarizer RP. When the polarized light passed through the bifacial reflective polarizer RP further passes through the first liquid crystal layer LC1, the polarization direction of the polarized light is perpendicular to the absorption axis of the first polarizer P1, therefore, the light may pass through the first polarizer P1 so that another side of the polarizer module 100 is also in the transparent state.

In the following paragraphs, FIG. 3A to FIG. 3D are used to illustrate how a polarizer module 200 in another embodiment switches between the mirror mode and the transparent mode by operating the first liquid crystal layer LC1 and/or the second liquid crystal layer LC2. The polarizer module 200 is similar to the polarizer module 100 except that the reflection axis of the bifacial reflective polarizer RP in the polarizer module 200 is perpendicular to an absorption axis of one of the first polarizer P1 and the second polarizer P2. Therefore, the same or similar elements are given the same or similar reference numerals, and the connection relationship, the materials, and the processes of the remaining members have been described in detail in the foregoing paragraphs, which are not be repeated hereinafter.

Figure 3A:
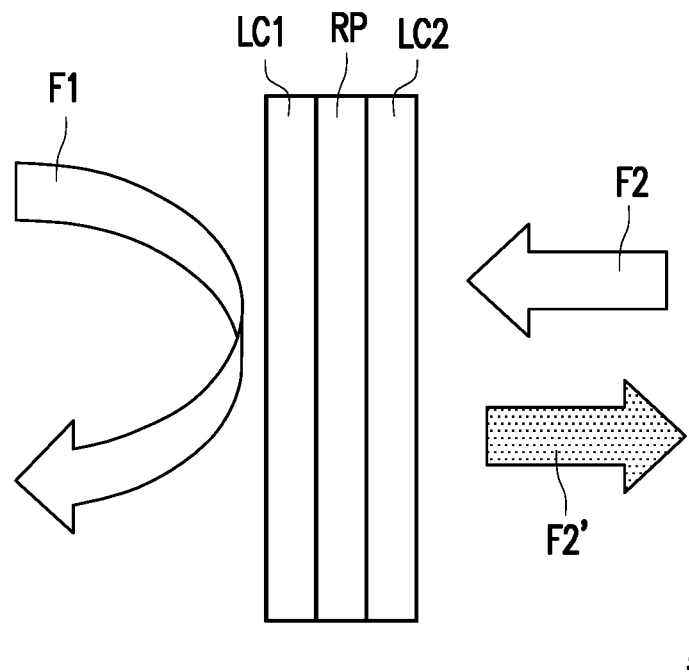
FIG. 3A to FIG. 3D are schematic diagrams illustrating how the polarizer module switches between the mirror mode and the transparent mode by operating the first liquid crystal layer and/or the second liquid crystal layer in another embodiment of the invention.
Figure 3B:
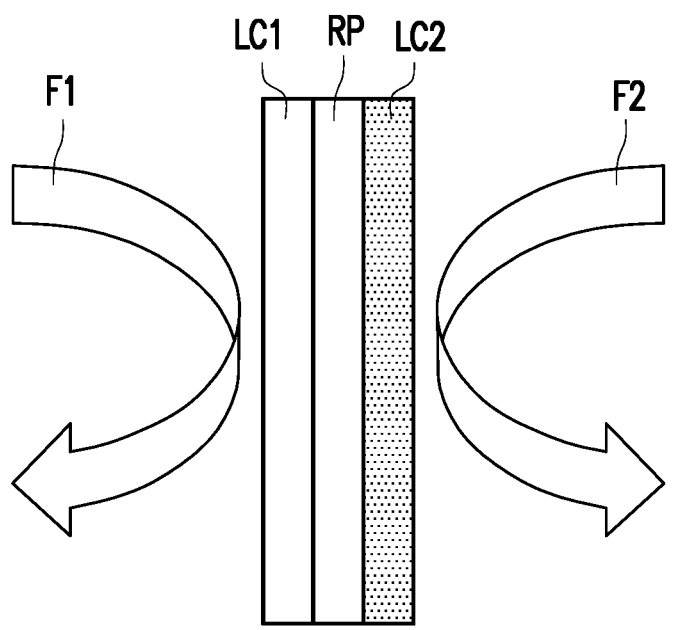
Figure 3C:
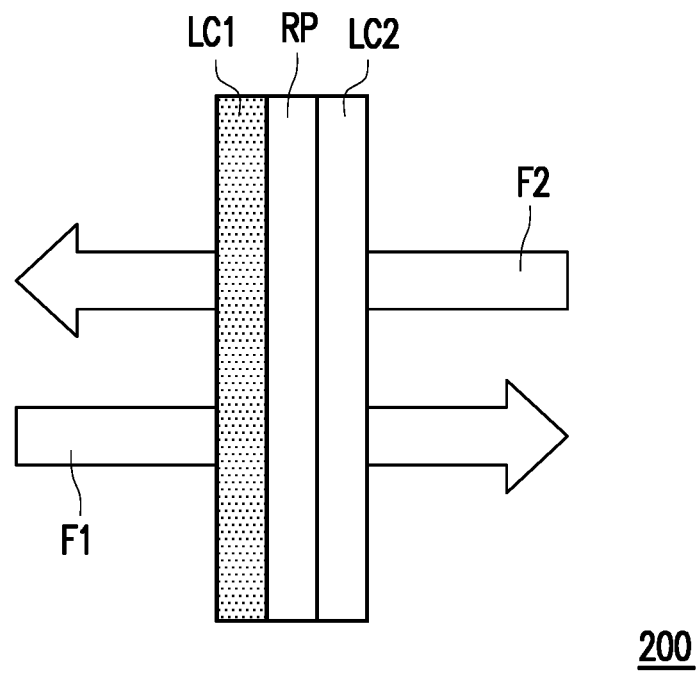
Figure 3D:
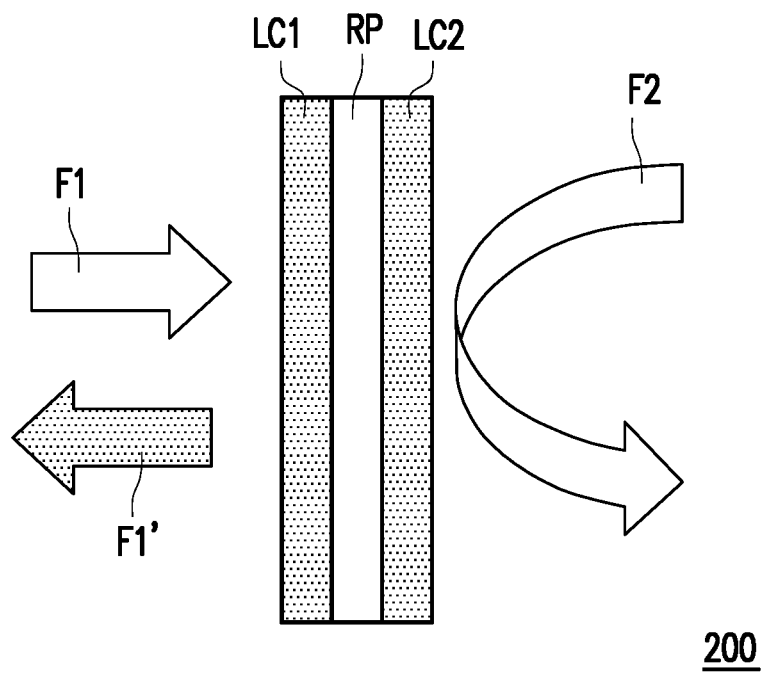
Figure 4A:
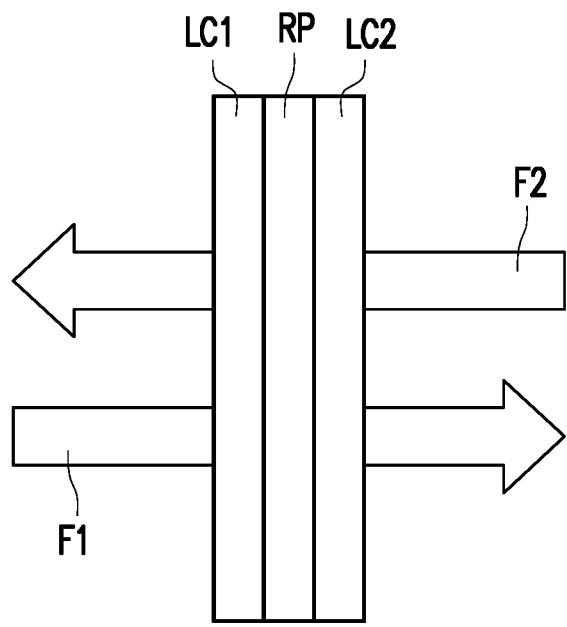
FIG. 4A to FIG. 4C are schematic diagrams illustrating how the polarizer module switches between the mirror mode and the transparent mode by operating the first liquid crystal layer and/or the second liquid crystal layer in yet another embodiment of the invention.
Figure 4B:
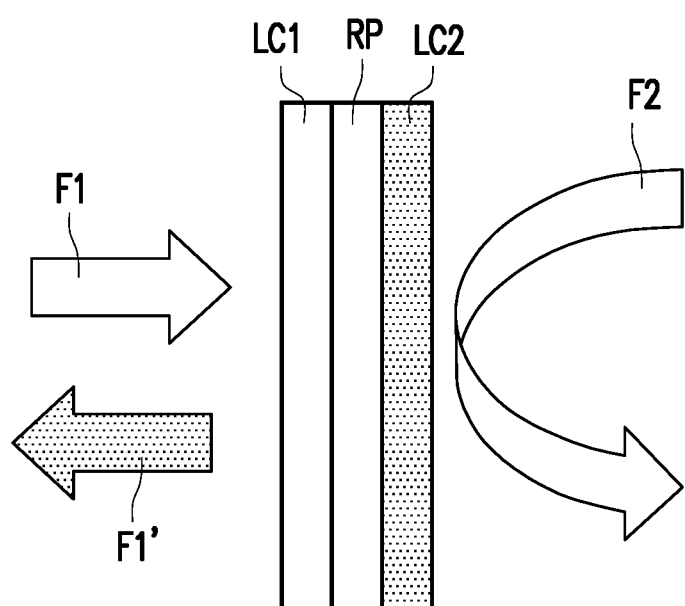
Figure 4C:
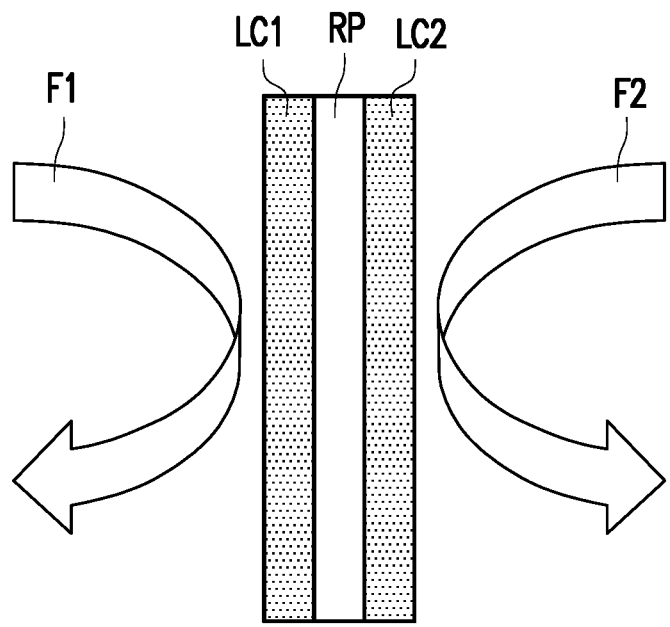

FIG. 3A and FIG. 3D illustrate the examples of enabling the polarizer module 200 to perform the single mirror mode; FIG. 3B illustrates the example of enabling the polarizer module 200 to perform the dual mirror mode; FIG. 3C illustrates the example of enabling the polarizer module 200 to perform the transparent mode. In this embodiment, the reflection axis of the bifacial reflective polarizer RP is perpendicular to the absorption axis of one of the first polarizer P1 and the second polarizer P2.

Referring to FIG. 3A and FIG. 3D together, when the reflection axis of the bifacial reflective polarizer RP is perpendicular to the absorption axis of one of the first polarizer P1 and the second polarizer P2, the single mirror mode may be performed by simultaneously applying voltage to the first liquid crystal layer LC1 and the second liquid crystal layer LC2 (as shown by FIG. 3D) or not applying voltage to the first liquid crystal layer LC1 and the second liquid crystal layer LC2 (as shown by FIG. 3A). In this embodiment, the reflection axis of the bifacial reflective polarizer RP may be perpendicular to the absorption axis of the first polarizer P1 and parallel to the absorption axis of the second polarizer P2, but the invention is not limited thereto. In other embodiments, the reflection axis of the bifacial reflective polarizer RP may be parallel to the absorption axis of the first polarizer P1 and perpendicular to the absorption axis of the second polarizer P2.

Referring to FIG. 3A, when the reflection axis of the bifacial reflective polarizer RP is perpendicular to the absorption axis of the first polarizer P1 and parallel to the absorption axis of the second polarizer P2, the single mirror mode may be performed by not applying voltage to the first liquid crystal layer LC1 and the second liquid crystal layer LC2. For instance, a polarization direction of a polarized light passed through the first polarizer P1 and the first liquid crystal layer LC1 is parallel to the reflection axis of the bifacial reflective polarizer RP, therefore, the light F1 may be reflected by the bifacial reflective polarizer RP so that one side of the polarizer module 200 is in the mirror state. On the other hand, a polarization direction of a polarized light passed through the second polarizer P2 and the second liquid crystal layer LC2 is perpendicular to the reflection axis of the bifacial reflective polarizer RP and parallel to the absorption axis of the first polarizer P1, therefore, the light F2 may transmit through the bifacial reflective polarizer RP and may be absorbed by the first polarizer P1 so that another side of the polarizer module 200 is in the black state (as shown by the arrow F2').

Referring to FIG. 3D, when the reflection axis of the bifacial reflective polarizer RP is perpendicular to the absorption axis of the first polarizer P1 and parallel to the absorption axis of the second polarizer P2, the single mirror mode may be performed by simultaneously applying voltage to the first liquid crystal layer LC1 and the second liquid crystal layer LC2. For instance, a polarization direction of a polarized light passed through the first polarizer P1 and the first liquid crystal layer LC1 is perpendicular to the reflection axis of the bifacial reflective polarizer RP and parallel to the absorption axis of the second polarizer P2, therefore, the light F1 may transmit through the bifacial reflective polarizer RP and may be absorbed by the second polarizer P2 so that one side of the polarizer module 200 is in the black state (as shown by an arrow F1'). On the other hand, a polarization direction of a polarized light passed through the second polarizer P2 and the second liquid crystal layer LC2 is parallel to the reflection axis of the bifacial reflective polarizer RP, therefore, the light F2 may be reflected by the bifacial reflective polarizer RP so that another side of the polarizer module 200 is in the mirror state.

Referring to FIG. 3B and FIG. 3C together, when the reflection axis of the bifacial reflective polarizer RP is perpendicular to the absorption axis of one of the first polarizer P1 and the second polarizer P2, the dual mirror mode (as shown in FIG. 3B) or the transparent mode (as shown in FIG. 3C) may be performed by applying voltage to only one of the first liquid crystal layer LC1 and the second liquid crystal layer LC2. In this embodiment, the reflection axis of the bifacial reflective polarizer RP may be perpendicular to the absorption axis of the first polarizer P1 and parallel to the absorption axis of the second polarizer P2. In other embodiments, the reflection axis of the bifacial reflective polarizer RP may be parallel to the absorption axis of the first polarizer P1 and perpendicular to the absorption axis of the second polarizer P2.

Referring to FIG. 3B, when the reflection axis of the bifacial reflective polarizer RP is perpendicular to the absorption axis of the first polarizer P1 and parallel to the absorption axis of the second polarizer P2, the dual mirror mode may be performed by applying voltage to the second liquid crystal layer LC2 and not applying voltage to the first liquid crystal layer LC1. For instance, a polarization direction of a polarized light passed through the first polarizer P1 and the first liquid crystal layer LC1 is parallel to the reflection axis of the bifacial reflective polarizer RP, therefore, the light F1 may be reflected by the bifacial reflective polarizer RP so that one side of the polarizer module 200 is in the mirror state. On the other hand, a polarization direction of a polarized light passed through the second polarizer P2 and the second liquid crystal layer LC2 is parallel to the reflection axis of the bifacial reflective polarizer RP, the light F2 may be reflected by the bifacial reflective polarizer RP so that another side of the polarizer module 200 is also in the mirror state.

Referring to FIG. 3C, when the reflection axis of the bifacial reflective polarizer RP is perpendicular to the absorption axis of the first polarizer P1 and parallel to the absorption axis of the second polarizer P2, the transparent mode may be performed by applying voltage to the first liquid crystal layer LC1 and not applying voltage to the second liquid crystal layer LC2. For instance, a polarization direction of a polarized light passed through the first polarizer P1 and the first liquid crystal layer LC1 is perpendicular to the reflection axis of the bifacial reflective polarizer RP, therefore, the light may pass through the bifacial reflective polarizer RP. When the polarized light passed through the bifacial reflective polarizer RP further passes through the second liquid crystal layer LC2, the polarization direction of the polarized light is perpendicular to the absorption axis of the second polarizer P2, therefore, the light may pass through the second polarizer P2 so that one side of the polarizer module 100 is in the transparent state. On the other hand, a polarization direction of a polarized light passed through the second polarizer P2 and the second liquid crystal layer LC2 is perpendicular to the reflection axis of the bifacial reflective polarizer RP, therefore, the light may pass through the bifacial reflective polarizer RP. When the polarized light passed through the bifacial reflective polarizer RP further passes through the first liquid crystal layer LC1, the polarization direction of the polarized light is perpendicular to the absorption axis of the first polarizer P1, therefore, the light may pass through the first polarizer P1 so that another side of the polarizer module 200 is in the transparent state.

In the following paragraphs, FIG. 4A to FIG. 4C are used to illustrate how a polarizer module 300 in yet another embodiment of the invention switches between the mirror mode and the transparent mode by operating the first liquid crystal layer and/or the second liquid crystal layer. The polarizer module 300 is similar to the polarizer module 100 except that the reflection axis of the bifacial reflective polarizer RP in the polarizer module 300 is parallel to the absorption axes of the first polarizer P1 and the second polarizer P2. Therefore, the same or similar elements are given the same or similar reference numerals, and the connection relationship, the materials, and the processes of the remaining members have been described in detail in the foregoing paragraphs, which are not be repeated hereinafter.

In this embodiment, FIG. 4A to FIG. 4C illustrate the examples of enabling the polarizer module 300 to perform the dual mirror mode, the single mirror mode, and the transparent mode respectively. In this embodiment, the reflection axis of the bifacial reflective polarizer RP is parallel to the absorption axis of the first polarizer P1 and the absorption axis of the second polarizer P2.

Referring to FIG. 4A, when the reflection axis of the bifacial reflective polarizer RP is parallel to the absorption axis of the first polarizer P1 and the absorption axis of the second polarizer P2, the transparent mode may be performed by not applying voltage to the first liquid crystal layer LC1 and the second liquid crystal layer LC2. For instance, a polarization direction of a polarized light passed through the first polarizer P1 and the first liquid crystal layer LC1 is perpendicular to the reflection axis of the bifacial reflective polarizer RP and the absorption axis of the second polarizer P2, therefore, the light may pass through the bifacial reflective polarizer RP and the second polarizer P2 so that one side of the polarizer module 300 is in the transparent state. Similarly, a polarization direction of a polarized light passed through the second polarizer P2 and the second liquid crystal layer LC2 is perpendicular to the reflection axis of the bifacial reflective polarizer RP and the absorption axis of the first polarizer P1, therefore, the light may pass through the bifacial reflective polarizer RP and the first polarizer P1 so that another side of the polarizer module 300 is also in the transparent state.

Referring to FIG. 4B, when the reflection axis of the bifacial reflective polarizer RP is parallel to the absorption axis of the first polarizer P1 and the absorption axis of the second polarizer P2, the single mirror mode may be performed by applying voltage to only one of the first liquid crystal layer LC1 and the second liquid crystal layer LC2. For instance, voltage can be applied to the second liquid crystal layer LC2 while no voltage is applied to the first liquid crystal layer LC1. In this way, a polarization direction of a polarized light passed through the second polarizer P2 and the second liquid crystal layer LC2 is parallel to the reflection axis of the bifacial reflective polarizer RP, therefore, the light F2 may be reflected by the bifacial reflective polarizer RP so that one side of the polarizer module 300 is in the mirror state. On the other hand, a polarization direction of a polarized light passed through the first polarizer P1 and the first liquid crystal layer LC1 is perpendicular to the reflection axis of the bifacial reflective polarizer RP and parallel to the absorption axis of the second polarizer P2, therefore, the light F1 may transmit through the bifacial reflective polarizer RP and may be absorbed by the second polarizer P2 so that another side of the polarizer module 300 is in the black state (as shown by the arrow F1').

Referring to FIG. 4C, when the reflection axis of the bifacial reflective polarizer RP is parallel to the absorption axis of the first polarizer P1 and the absorption axis of the second polarizer P2, the dual mirror mode may be performed by simultaneously applying voltage to the first liquid crystal layer LC1 and the second liquid crystal layer LC2. For instance, a polarization direction of a polarized light passed through the first polarizer P1 and the first liquid crystal layer LC1 is parallel to the reflection axis of the bifacial reflective polarizer RP, therefore, the light F1 may be reflected by the bifacial reflective polarizer RP so that one side of the polarizer module 300 is in the mirror state. Similarly, a polarization direction of a polarized light passed through the second polarizer P2 and the second liquid crystal layer LC2 is parallel to the reflection axis of the bifacial reflective polarizer RP, therefore, the light F2 may be reflected by the bifacial reflective polarizer RP so that another side of the polarizer module 300 is also in the mirror state.

Figure 5:
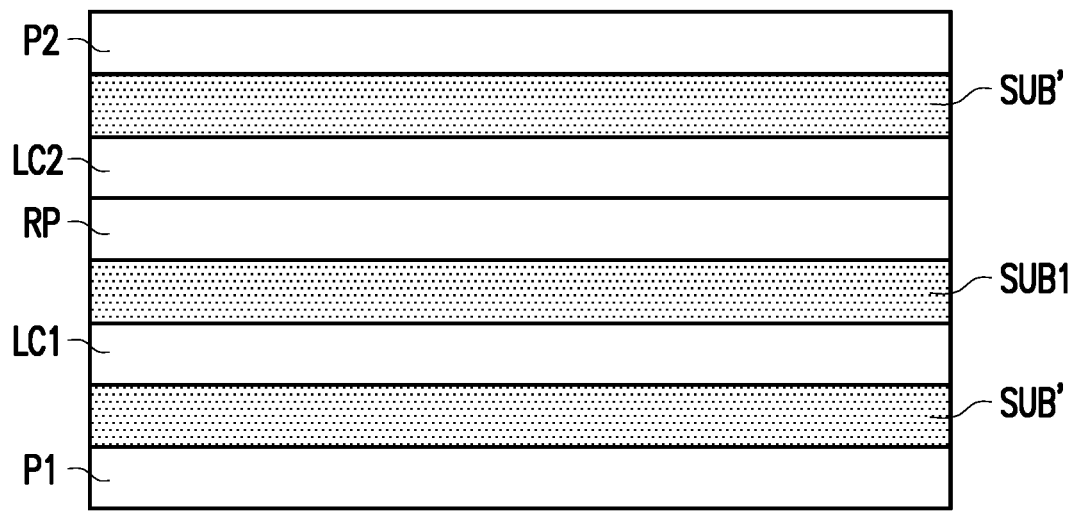
FIG. 5 is a cross-sectional view of the polarizer module in another embodiment of the invention.
Figure 6:
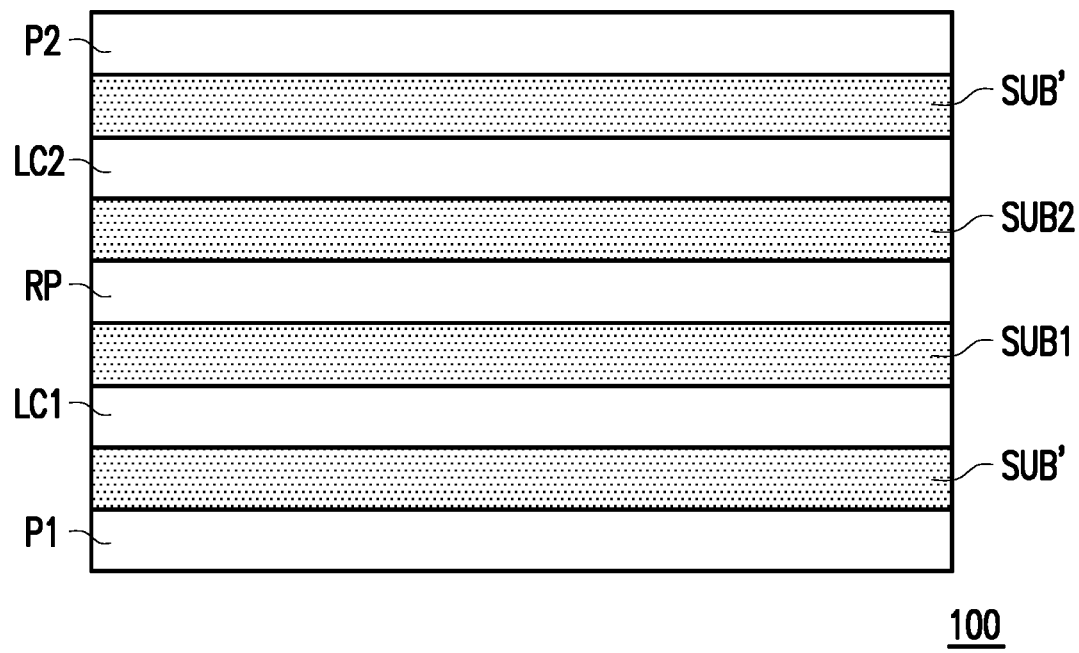
FIG. 6 is a cross-sectional view of the polarizer module in yet another embodiment of the invention.
Figure 7:
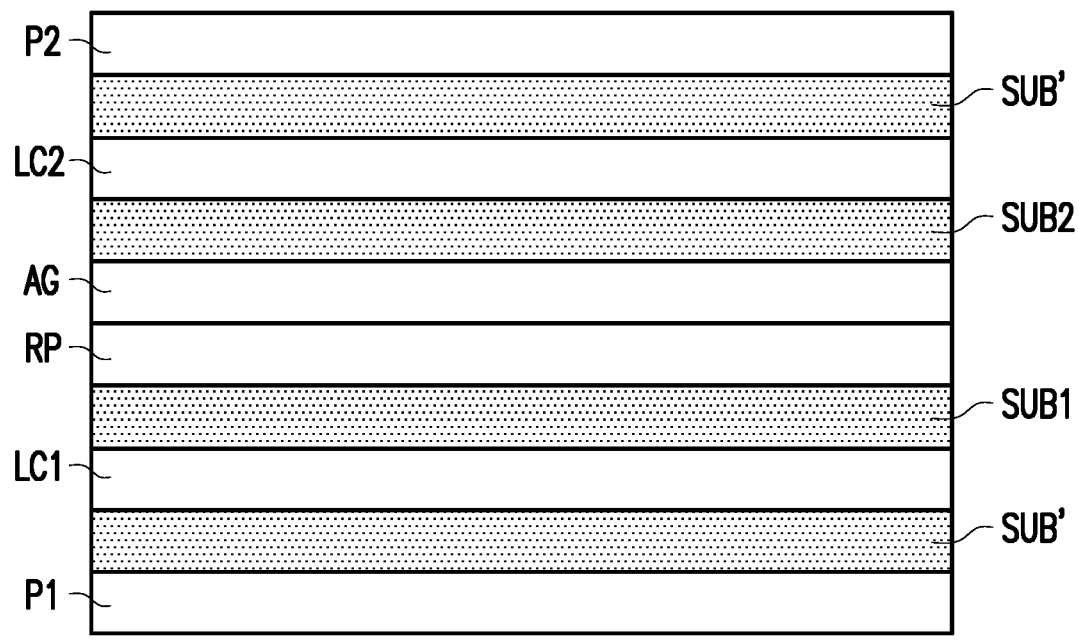
FIG. 7 is a cross-sectional view of the polarizer module in still another embodiment of the invention.

FIG. 5 is a cross-sectional view of the polarizer module in another embodiment of the invention. FIG. 6 is a cross-sectional view of the polarizer module in yet another embodiment of the invention. FIG. 7 is a cross-sectional view of the polarizer module in still another embodiment of the invention.

Referring to FIG. 5, the polarizer module 100 may further include a first substrate SUB1, which is disposed between the first liquid crystal layer LC1 and the second liquid crystal layer LC2 so the first liquid crystal layer LC1 and the second liquid crystal layer LC2 can share the first substrate SUB1. In this embodiment, the bifacial reflective polarizer RP may be the wire grid polarizer (WGP). In this embodiment, another substrate SUB' may be further included between the first liquid crystal layer LC1 and the first polarizer P1 and between the second liquid crystal layer LC2 and the second polarizer P2. That is to say, the polarizing module 100 may be a three-substrate dual cell structure.

In some embodiments, as shown by FIG. 6, the polarizer module 100 may further include a second substrate SUB2, which is disposed between the bifacial reflective polarizer RP and the second liquid crystal layer LC2, wherein the first substrate SUB1 is disposed between the bifacial reflective polarizer RP and the first liquid crystal layer LC1. That is to say, the polarizing module 100 may be a four-substrate dual cell structure. In this embodiment, the bifacial reflective polarizer RP may be the reflective polarizer mirror (RPM). In other embodiments, as shown by FIG. 7, an air gap AG may be included between the first substrate SUB1 and the second substrate SUB2 to improve heat insulation efficiency for the polarizer module 100.

Figure 8:
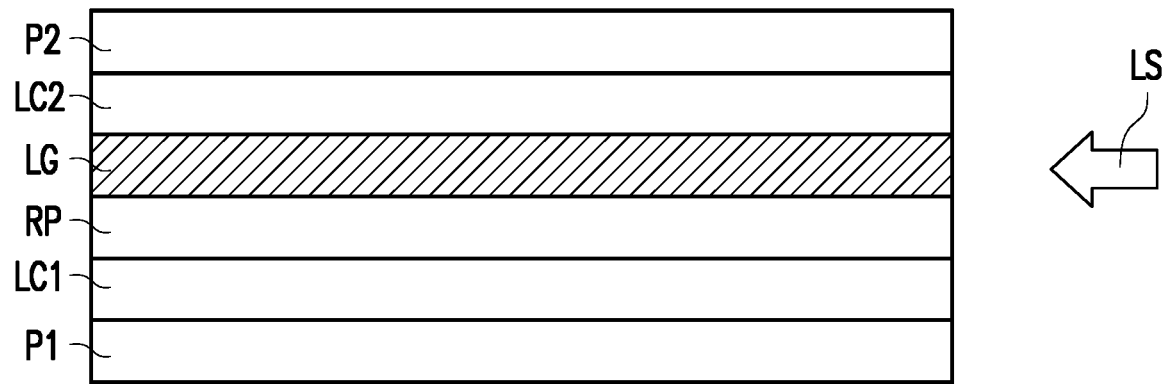
FIG. 8 is a cross-sectional view of the polarizer module in still yet another embodiment of the invention.

FIG. 8 is a cross-sectional view of the polarizer module in still yet another embodiment of the invention.

Referring to FIG. 8, the polarizer module 100 may optionally include a side light source LS and a light guide plate LG. The light guide plate LG is disposed between the bifacial reflective polarizer RP and at least one of the first liquid crystal layer LC1 or the second liquid crystal layer LC2. The side light source LS is configured at one side of the bifacial reflective polarizer RP. In the case where the side light source LS is turned on, an unpolarized light from the side light source LS may be incident to at least one of the opposite sides of the bifacial reflective polarizer RP through the light guide plate LG, and thus a portion (hereinafter first portion) of the unpolarized light from the side light source LS transmit through the bifacial reflective polarizer RP, whereas another portion (hereinafter second portion) of the unpolarized light from the side light source LS is reflected by the bifacial reflective polarizer RP. Therefore, a mirror display state, a transparent display state, a normal display state, a black state, a transparent state, and/or a mirror state may be exhibited on either side of the polarizer module 100 by operating the first liquid crystal layer LC1, the second liquid crystal layer LC2, and/or the side light source LS.

Figure 10:
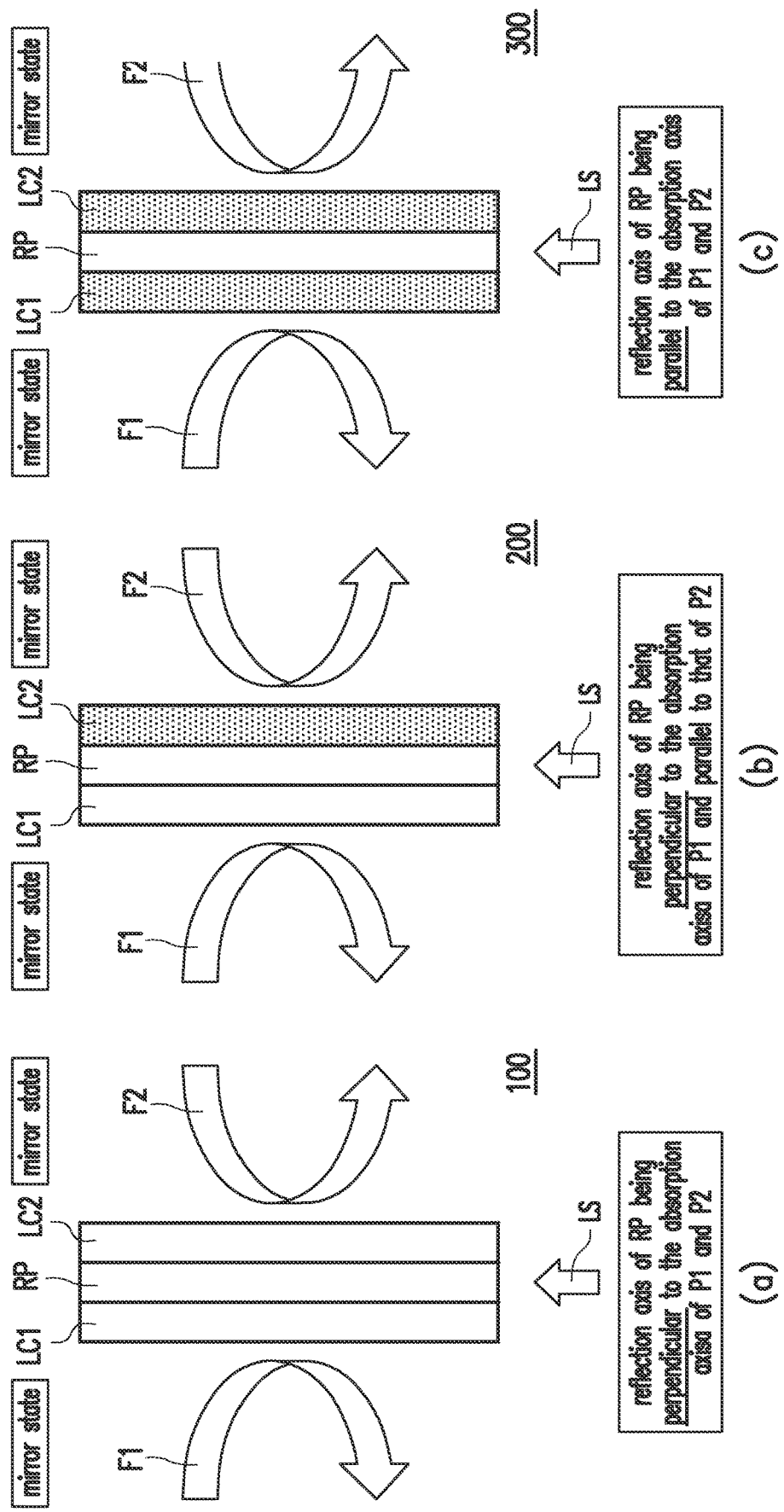
FIG. 10 shows the mirror states being exhibited on both opposite sides of the polarizer module in different embodiments of the invention (e.g., (a), (b), and (c) in FIG. 10) in the case where the side light source is turned off and the first and second polarized lights are reflected by the bifacial reflective polarizer.

In some embodiments, in the case where the side light source LS is turned off, the light guide plate LG is configured between the bifacial reflective polarizer RP and the second liquid crystal layer LC2, and the reflection axis of the bifacial reflective polarizer RP is perpendicular to the absorption axes of the first and second polarizer P1 and P2, the mirror states are exhibited on both opposite sides of the polarizer module by not applying voltage to the first and second liquid crystal layers LC1 and LC2. For example, the polarization directions of a first polarized light (e.g., F1 shown in (a) of FIG. 10), being passed through the first polarizer P1 and the first liquid crystal layer LC1 from a first external light, and a second polarized light (e.g., F2 shown in (a) of FIG. 10), being passed through the second polarizer P2 and the second liquid crystal layer LC2 from a second external light, are both parallel to the reflection axis of the bifacial reflective polarizer RP. As such, the first polarized light and the second polarized light are both reflected by the bifacial reflective polarizer RP and then transmit through the first polarizer P1 and the second polarizer P2, respectively. Based on the above, the mirror states are exhibited on both opposite sides of the polarizer module 100.

Figure 13:
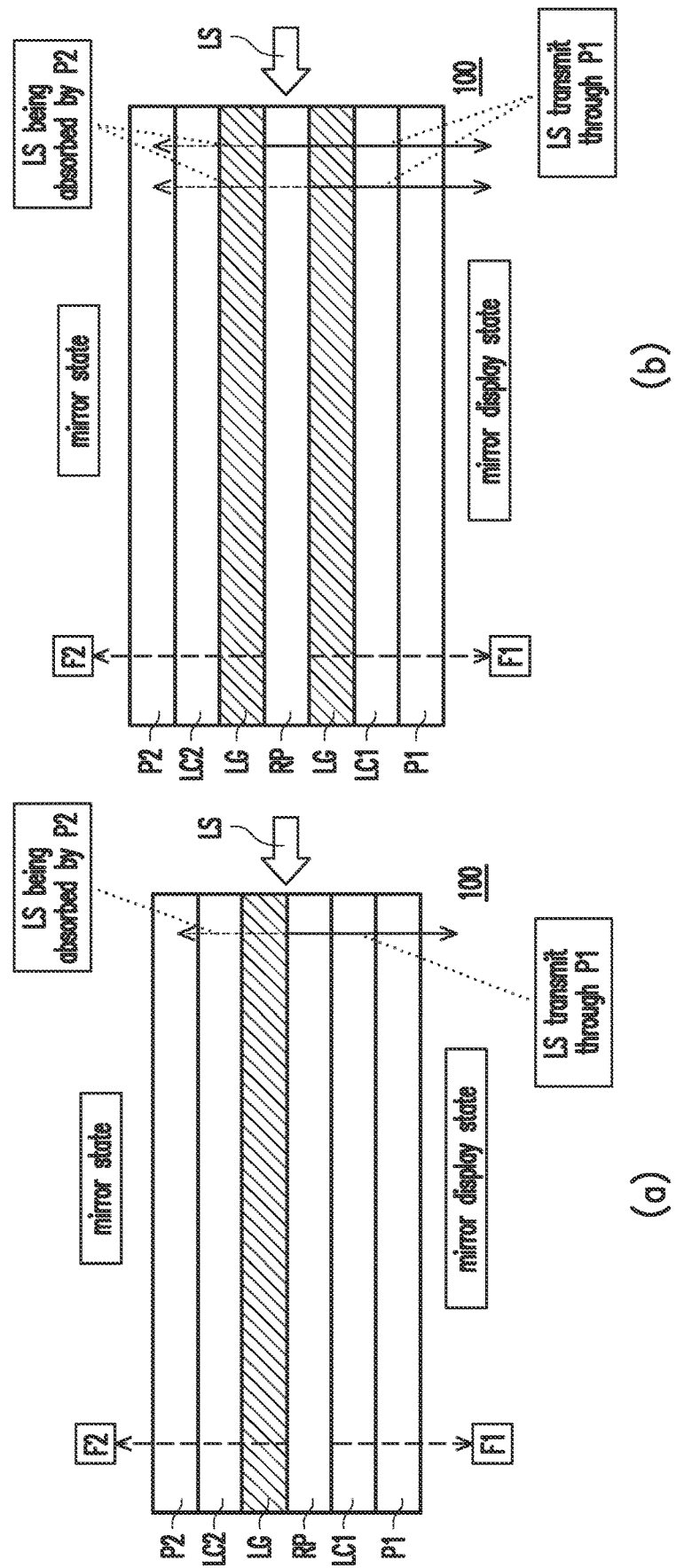
FIG. 13 shows a mirror display state being exhibited on one side of the polarizer module and a mirror state being exhibited on another side of the polarizer module in different embodiments of the invention (e.g., (a) and (b) in FIG. 13) in the case where the side light source is turned on, one of the first and second portions of the unpolarized light transmits through one of the first and second polarizers, and another one of the first and second portions of the unpolarized light is absorbed by another one of the first and second polarizers, and the first and second polarized lights are reflected by the bifacial reflective polarizer.
Figure 14:
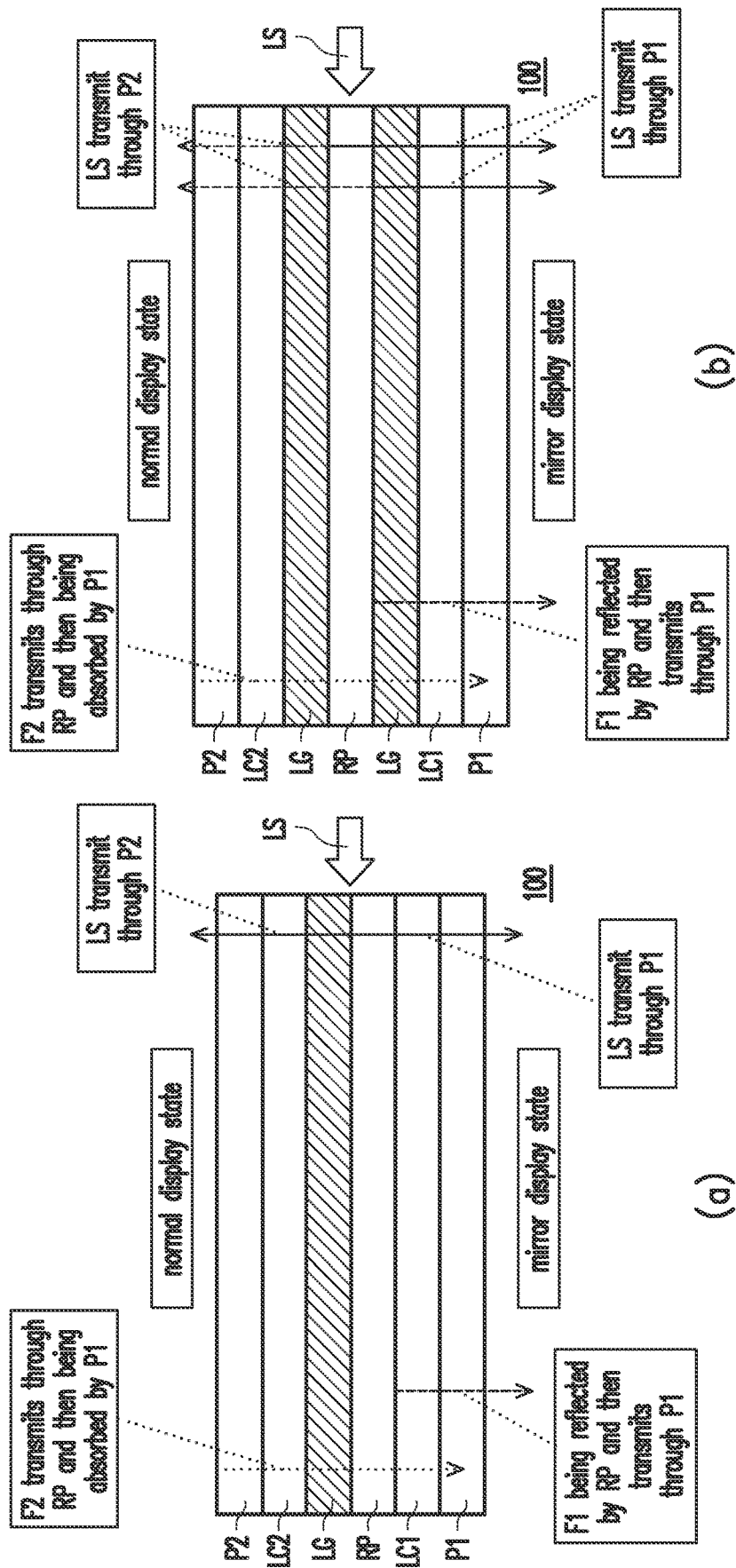
FIG. 14 shows mirror display state being exhibited on one side of the polarizer module and a normal display state being exhibited on another side of the polarizer module in different embodiments of the invention (e.g., (a) and (b) in FIG. 14) in the case where the side light source is turned on, the first and second portions of the unpolarized light respectively transmit through the first and second polarizers, one of the first and second polarized lights is reflected by the bifacial reflective polarizer, and another one of the first and second polarized lights transmits through the bifacial reflective polarizer and then is absorbed by the first or second polarizer.

In some alternative embodiments, in the case where the side light source LS is turned on, the light guide plate LG is disposed between the bifacial reflective polarizer RP and the second liquid crystal layer LC2, and the reflection axis of the bifacial reflective polarizer RP is perpendicular to the absorption axes of the first and second polarizer P1 and P2, the mirror display state and the mirror state are respectively exhibited on opposite sides of the polarizer module 100 by not applying voltage to the first and second liquid crystal layers LC1 and LC2. For example, the polarization directions of a first polarized light (e.g., F1 shown in (a) of FIG. 13), being passed through the first polarizer P1 and the first liquid crystal layer LC1 from a first external light, and a second polarized light (e.g., F2 shown in (a) of FIG. 13), being passed through the second polarizer P2 and the second liquid crystal layer LC2 from a second external light, are both parallel to the reflection axis of the bifacial reflective polarizer RP. As such, the first polarized light and the second polarized light are both reflected by the bifacial reflective polarizer RP and then transmit through the first polarizer P1 and the second polarizer P2, respectively. The first portion of the unpolarized light from the side light source LS transmits through the bifacial reflective polarizer RP and then is absorbed by the first polarizer P1 or the second polarizer P2 (e.g., (a) of FIG. 13). The second portion of the unpolarized light from the side light source LS is reflected by the bifacial reflective polarizer RP and then transmits through the second polarizer P2 or the first polarizer P1 (e.g., (a) of FIG. 13). Based on the above, the mirror display state is exhibited on one side of the polarizer module 100, and the mirror state is exhibited on another side of the polarizer module 100.

Figure 11:
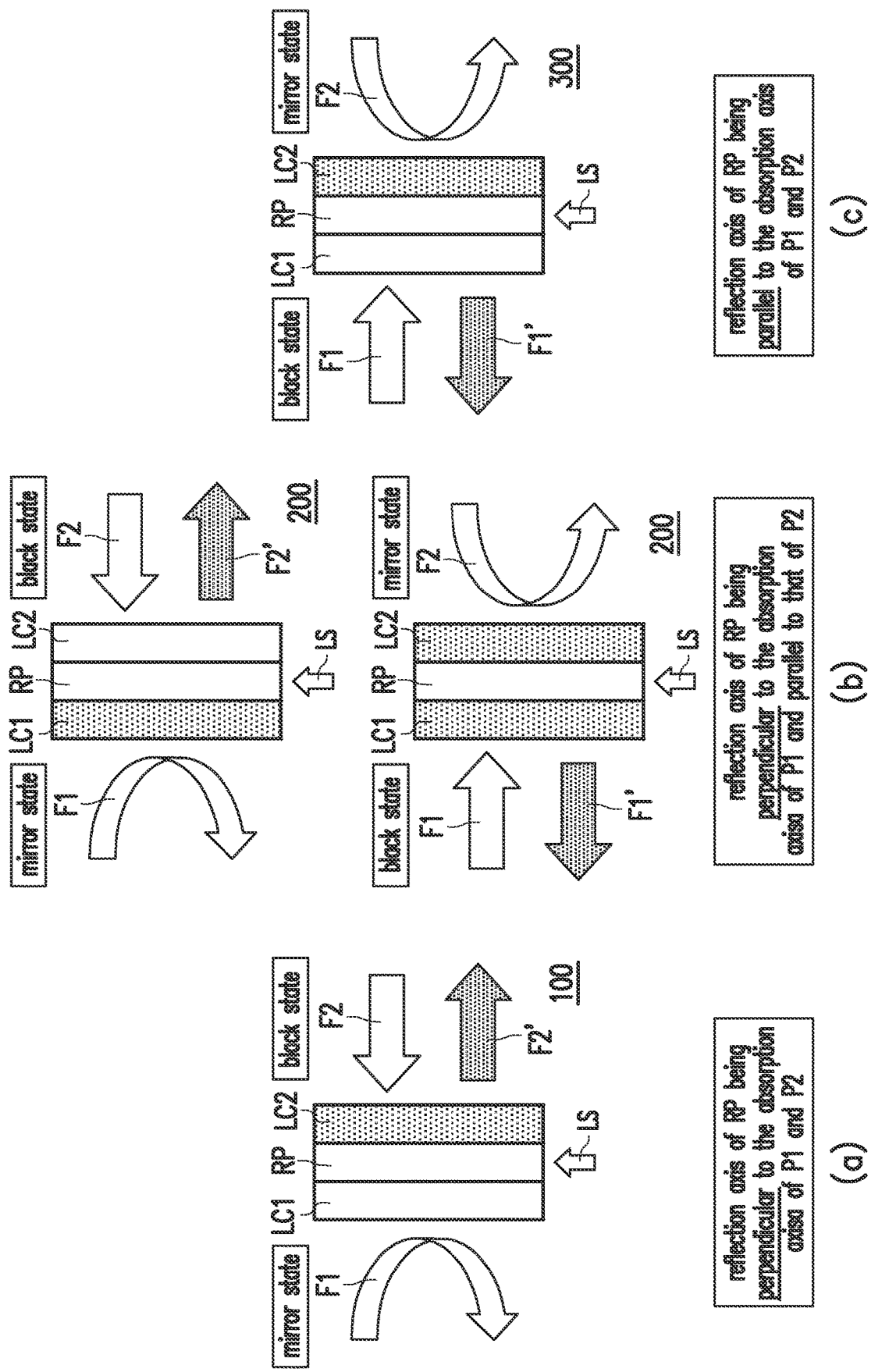
FIG. 11 shows the mirror state being exhibited on one side of the polarizer module and a black state being exhibited on another side of the polarizer module in different embodiments of the invention (e.g., (a), (b), and (c) in FIG. 11) in the case where the side light source is turned off, one of the first and second polarized lights is reflected by the bifacial reflective polarizer, and another one of the first and second polarized lights transmits through the bifacial reflective polarizer and then is absorbed by the first or second polarizer.

In some other embodiments, in the case where the side light source LS is turned off, the light guide plate LG is disposed between the bifacial reflective polarizer RP and the second liquid crystal layer LC2, the reflection axis of the bifacial reflective polarizer RP is perpendicular to the absorption axes of the first and second polarizer P1 and P2, the black state and the mirror state are respectively exhibited on opposite sides of the polarizer module 100 by applying voltage only to one of the first liquid crystal layer LC1 and the second liquid crystal layer LC2. For example, voltage can be applied to the second liquid crystal layer LC2 while no voltage is applied to the first liquid crystal layer LC1. In this way, the polarization direction of a first polarized light (e.g., F1 shown in (a) of FIG. 11) being passed through the first polarizer P1 and the first liquid crystal layer LC1 from a first external light is parallel to the absorption axis of the first polarizer P1, and the polarization direction of a second polarized light (e.g., F2 shown in (a) of FIG. 11) being passed through the second polarizer P2 and the second liquid crystal layer LC2 from a second external light is perpendicular to the reflection axis of the bifacial reflective polarizer RP. As such, the first polarized light is reflected by the bifacial reflective polarizer RP and then transmits through the first polarizer P1 (e.g., (a) of FIG. 11). The second polarized light transmits through the bifacial reflective polarizer RP and then is absorbed by the first polarizer P1 (e.g., (a) of FIG. 11). Based on the above, the black state is exhibited on one side of the polarizer module 100, and the mirror state is exhibited on another side of the polarizer module 100.

In some other alternative embodiments, in the case where the side light source LS is turned on, the light guide plate LG is disposed between the bifacial reflective polarizer RP and the second liquid crystal layer LC2, the reflection axis of the bifacial reflective polarizer RP is perpendicular to the absorption axes of the first and second polarizer P1 and P2, the black state and the mirror state are respectively exhibited on opposite sides of the polarizer module 100 by applying voltage only to the second liquid crystal layer LC2 (i.e., no voltage is applied to the first liquid crystal layer LC1). For example, the polarization direction of a first polarized light (e.g., F1 shown in (a) of FIB. 11) being passed through the first polarizer P1 and the first liquid crystal layer LC1 from a first external light is parallel to the absorption axis of the first polarizer P1, and the polarization direction of a second polarized light (e.g., F2 shown in (a) of FIB. 11) being passed through the second polarizer P2 and the second liquid crystal layer LC2 from a second external light is perpendicular to the reflection axis of the bifacial reflective polarizer RP. As such, the first polarized light is reflected by the bifacial reflective polarizer RP and then transmits through the first polarizer P1 (e.g., (a) of FIG.11). The second polarized light transmits through the bifacial reflective polarizer RP and then is absorbed by the first polarizer P1 (e.g., (a) of FIG. 11). The first portion of the unpolarized light from the side light source LS transmits through the bifacial reflective polarizer RP and then is absorbed by the first polarizer P1. The second portion of the unpolarized light from the side light source LS is reflected by the bifacial reflective polarizer RP and then is absorbed by the second polarizer P2. Based on the above, the black state is exhibited on one side of the polarizer module 100, and the mirror state is exhibited on another side of the polarizer module 100.

Figure 12:
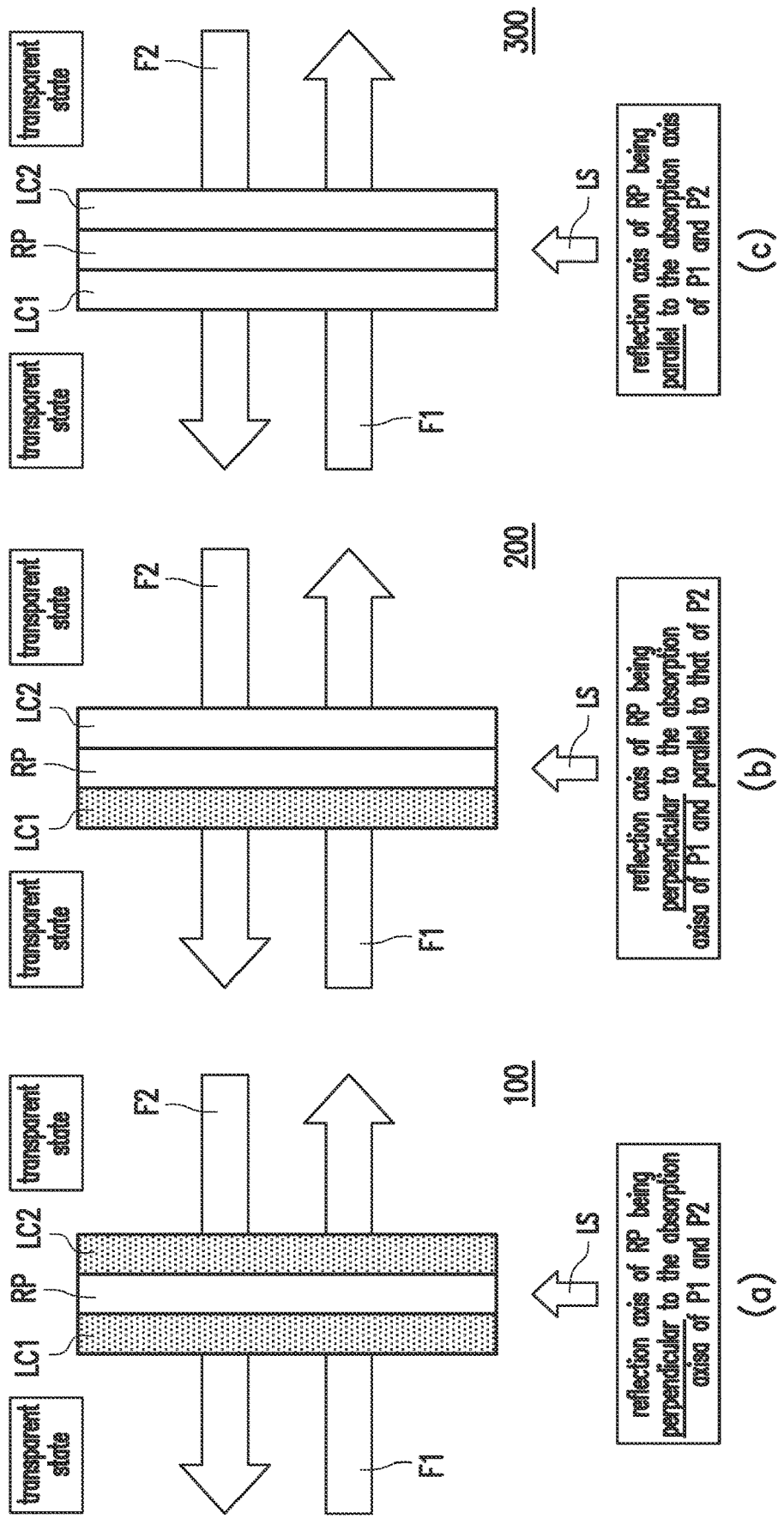
FIG. 12 shows the transparent states being exhibited on both sides of the polarizer module in different embodiments of the invention (e.g., (a), (b), and (c) in FIG. 12) in the case where the side light source is turned off and the first and second polarized lights transmit through the bifacial reflective polarizer.

In some yet other embodiments, in the case where the side light source LS is turned off, the light guide plate LG is configured between the bifacial reflective polarizer RP and the second liquid crystal layer LC2, the reflection axis of the bifacial reflective polarizer RP is perpendicular to the absorption axes of the first and second polarizer P1 and P2, the transparent states are exhibited on opposite sides of the polarizer module 100 by applying voltage to the first and second liquid crystal layers LC1 and LC2. For example, the polarization directions of a first polarized light (e.g., F1 shown in (a) of FIG. 12), being passed through the first polarizer P1 and the first liquid crystal layer LC1 from a first external light, and a second polarized light (e.g., F2 shown in (a) of FIG. 12), being passed through the second polarizer P2 and the second liquid crystal layer LC2 from a second external light, are both perpendicular to the reflection axis of the bifacial reflective polarizer RP. As such, the first polarized light transmits through the bifacial reflective polarizer RP and the second polarizer P2. The second polarized light transmits through the bifacial reflective polarizer RP and the first polarizer P1. Based on the above, the transparent states are exhibited on both sides of the polarizer module.

Figure 15:
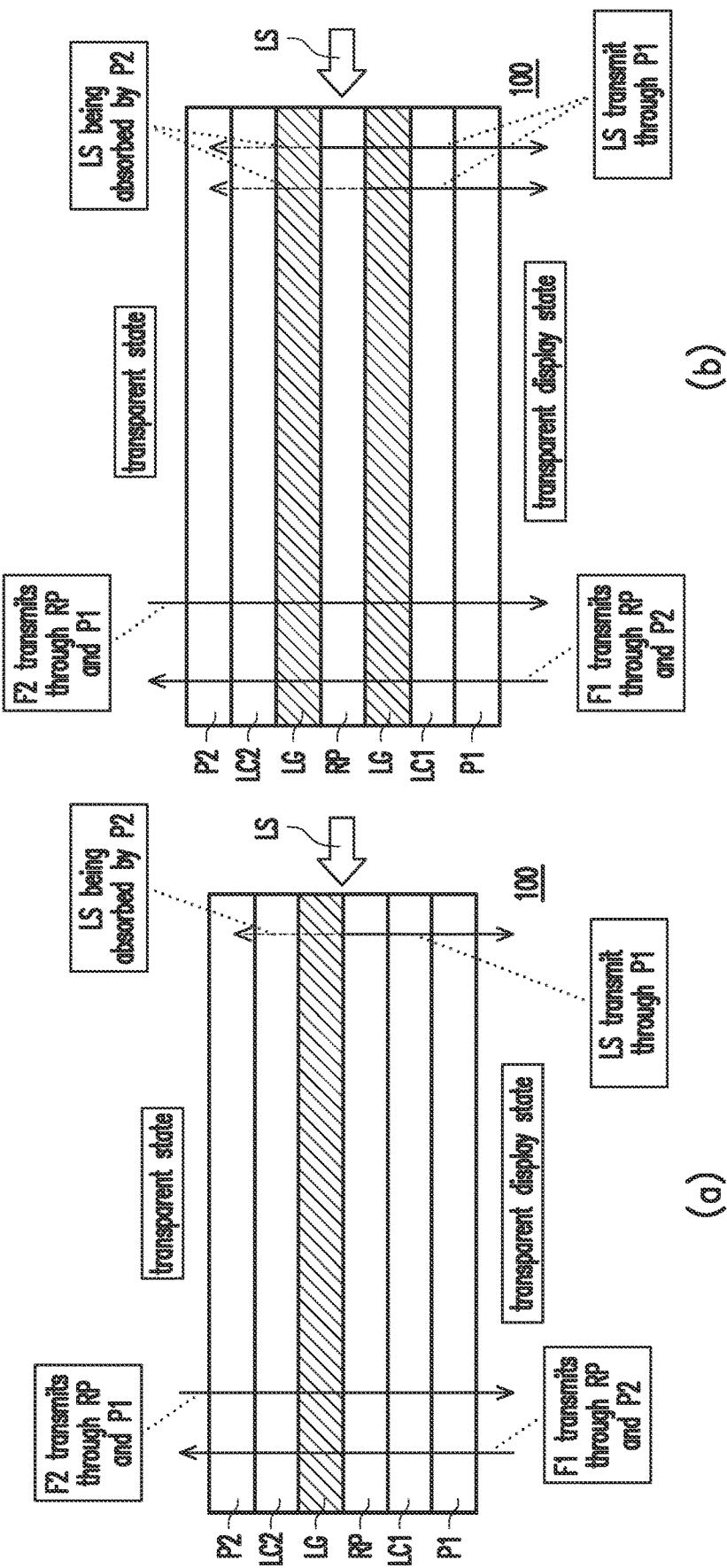
FIG. 15 shows a transparent display state being exhibited on one side of the polarizer module and the transparent state being exhibited on another side of the polarizer module in different embodiments of the invention (e.g., (a) and (b) in FIG. 15) in the case where the side light source is turned on, one of the first and second portions of the unpolarized light transmits through one of the first and second polarizers, another one of the first and second portions of the unpolarized light is absorbed by another one of the first and second polarizers, and the first and second polarized lights transmit through the bifacial reflective polarizer.

In some yet other alternative embodiments, in the case where the side light source LS is turned on, the light guide plate LG is configured between the bifacial reflective polarizer RP and the second liquid crystal layer LC2, the reflection axis of the bifacial reflective polarizer RP is perpendicular to the absorption axes of the first and second polarizer P1 and P2, the transparent state and the transparent display state are respectively exhibited on opposite sides of the polarizer module 100 by applying voltage to the first and second liquid crystal layers LC1 and LC2. For example, the polarization directions of a first polarized light (e.g., F1 shown in (a) of FIG. 15), being passed through the first polarizer P1 and the first liquid crystal layer LC1 from a first external light, and a second polarized light (e.g., F2 shown in (a) of FIG. 15), being passed through the second polarizer P2 and the second liquid crystal layer LC2 from a second external light, are both perpendicular to the reflection axis of the bifacial reflective polarizer RP. As such, the first polarized light transmits through the bifacial reflective polarizer RP and the second polarizer P2. The second polarized light transmits through the bifacial reflective polarizer RP and the first polarizer P1. The first portion of the unpolarized light from the side light source LS transmits through the bifacial reflective polarizer RP and the first polarizer P1 (e.g., (a) of FIG. 15). The second portion of the unpolarized light from the side light source LS is reflected by the bifacial reflective polarizer RP and then is absorbed by the second polarizer P2 (e.g., (a) of FIG. 15). Based on the above, the transparent state is exhibited on one side of the polarizer module 100, and the transparent display state is exhibited on another side of the polarizer module 100.

Based on the above, since the side light source LS may be turned on or turned off according to the needs, the polarizer module 100 may be capable of performing the dual mirror mode, the single mirror mode, the transparent mode, the mirror display mode, the transparent display mode, and/or the normal display mode.

In some embodiments, the polarizer module 100 may be applied to a display substrate to form a display device that can enable the mirror display mode and the transparent display mode. For example, in the case where the unpolarized light from the side light source is absorbed by at least one of the first or second polarizer, the mirror display state is exhibited on one side of the display and the mirror state is exhibited on another side of the display. That is, the display device can be used as a mirror and a mirror display. In the case where the first polarized light transmits through the bifacial reflective polarizer RP and the second polarizer P2, the second polarized light transmits through the bifacial reflective polarizer RP and the first polarizer P1, the first portion of the unpolarized light from the side light source LS transmits through the bifacial reflective polarizer RP and the first polarizer P1, and the second portion of the unpolarized light from the side light source LS is reflected by the bifacial reflective polarizer RP and then is absorbed by the second polarizer P2, the transparent state is exhibited on one side of the display and the transparent display state is exhibited on another side of the display. That is, the display device can be used as a transparent window and a transparent display.

Figure 9:
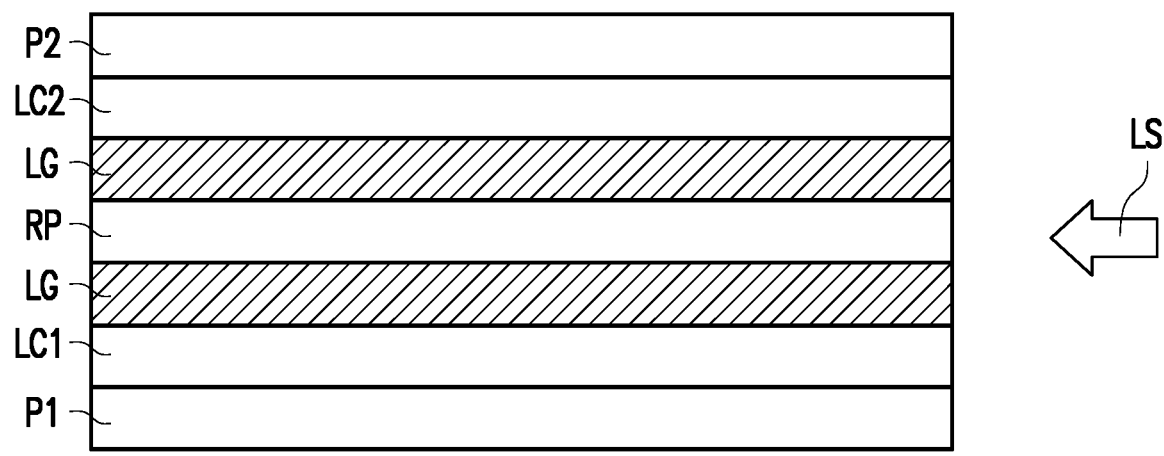
FIG. 9 is a cross-sectional view of the polarizer module in still yet another embodiment of the invention.

FIG. 9 is a cross-sectional view of the polarizer module in still yet another embodiment of the invention.

In some embodiment, referring to FIG. 9, the light guide plates LG may be disposed between the bifacial reflective polarizer RP and the first liquid crystal layer LC1 and between the bifacial reflective polarizer RP and the second liquid crystal layer LC2. In this embodiment, the unpolarized light from the side light source LS may be incident to the opposite sides of the bifacial reflective polarizer RP through the light guide plates LG. In this way, the mirror display state, the transparent display state, the normal display state, the black state, the transparent state, and/or the mirror state may be exhibited on either side of the polarizer module 100 by the configuration of the absorption axes of the first polarizer P1 and/or the second polarizer P2 and the operation of the first liquid crystal layer LC1 and/or the second liquid crystal layer LC2.

In summary, due to the polarizer module of the invention includes the bifacial reflective polarizer, the first liquid crystal layer, the second liquid crystal layer, the first polarizer and the second polarizer configured as above, so the polarizer module can switch between the mirror mode (e.g. the dual mirror mode or the single mirror mode) and the transparent mode by operating the first liquid crystal layer and/or the second liquid crystal layer.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:
1. A polarizer module, comprising:
   a bifacial reflective polarizer comprising a first surface and a second surface opposite to each other;
   a first liquid crystal layer and a second liquid crystal layer disposed on the first surface and the second surface, respectively;

a first polarizer and a second polarizer disposed on the first liquid crystal layer and the second liquid crystal layer, respectively;

a light guide plate disposed between the bifacial reflective polarizer and at least one of the first liquid crystal layer or the second liquid crystal layer; and a side light source configured at one side of the light guide plate, wherein a first polarized light, being passed through the first polarizer and the first liquid crystal from a first external light, is incident to the first surface of the bifacial reflective polarizer and can be reflected by or transmit through the bifacial reflective polarizer, a second polarized light, being passed through the second polarizer and the second liquid crystal from a second external light, is incident to the second surface of the bifacial reflective polarizer and can be reflected by or transmit through the bifacial reflective polarizer, an unpolarized light from the side light source is incident to the at least one of the first or second surface of the bifacial reflective polarizer through the light guide plate and comprises a first portion reflected the bifacial reflective polarizer and a second portion transmitting through the bifacial reflective polarizer when the side light source is turned on, and wherein:

when the side light source is turned off and the first and second polarized lights are reflected by the bifacial reflective polarizer, mirror states are exhibited on both opposite sides of the polarizer module, when the side light source is turned off, one of the first and second polarized lights is reflected by the bifacial reflective polarizer, and another one of the first and second polarized lights transmits through the bifacial reflective polarizer and then is absorbed by the first or second polarizer, the mirror state is exhibited on one side of the polarizer module and a black state is exhibit on another side of the polarizer module, when the side light source is turned off and the first and second polarized lights transmit through the bifacial reflective polarizer, transparent states are exhibited on both sides of the polarizer module, when the side light source is turned on, one of the first and second portions of the unpolarized light transmits through one of the first and second polarizers, and another one of the first and second portions of the unpolarized light is absorbed by another one of the first and second polarizers, and the first and second polarized lights are reflected by the bifacial reflective polarizer, a mirror display state is exhibited on one side of the polarizer module and a mirror state is exhibit on another side of the polarizer module, when the side light source is turned on, the first and second portions of the unpolarized light respectively transmit through the first and second polarizers, and one of the first and second polarized lights is reflected by the bifacial reflective polarizer, and another one of the first and second polarized lights transmits through the bifacial reflective polarizer and then is absorbed by the first or second polarizer, the mirror display state is exhibited on one side of the polarizer module and a normal display state is exhibit on another side of the polarizer module, and when the side light source is turned on, one of the first and second portions of the unpolarized light transmits through one of the first and second polarizers, and another one of the first and second portions of the unpolarized light is absorbed by another one of the first and second polarizers, the first and second polarized lights transmit through the bifacial reflective polarizer, a transparent display state is exhibited on one side of the polarizer module and the transparent state is exhibit on another side of the polarizer module.

2. The polarizer module according to claim 1, wherein a reflection axis of the bifacial reflective polarizer is perpendicular to an absorption axis of the first polarizer and an absorption axis of the second polarizer.

3. The polarizer module according to claim 1, wherein a reflection axis of the bifacial reflective polarizer is perpendicular to an absorption axis of one of the first polarizer and the second polarizer.

4. The polarizer module according to claim 3, wherein the reflection axis of the bifacial reflective polarizer is parallel to an absorption axis of another one of the first polarizer and the second polarizer.

5. The polarizer module according to claim 1, wherein a reflection axis of the bifacial reflective polarizer is parallel to an absorption axis of the first polarizer and an absorption axis of the second polarizer.

6. The polarizer module according to claim 1, further comprising:
a first substrate, disposed between the first liquid crystal layer and the second liquid crystal layer.

7. The polarizer module according to claim 6, further comprising:
a second substrate, disposed between the bifacial reflective polarizer and the second liquid crystal layer, wherein the first substrate is disposed between the bifacial reflective polarizer and the first liquid crystal layer.

8. The polarizer module according to claim 7, wherein an air gap is provided between the first substrate and the second substrate.

* * * * *